United States Patent [19]

Mir

[11] 4,412,922
[45] Nov. 1, 1983

[54] POSITIVE-CHARGED ULTRAFILTRATION MEMBRANE FOR THE SEPARATION OF CATHODIC/ELECTRODEPOSITION-PAINT COMPOSITIONS

[75] Inventor: Leon Mir, Newton, Mass.

[73] Assignee: Abcor, Inc., Wilmington, Mass.

[21] Appl. No.: 304,012

[22] Filed: Sep. 21, 1981

Related U.S. Application Data

[63] Continuation of Ser. No. 165,279, Jul. 2, 1980, abandoned.

[51] Int. Cl.$^3$ .............................................. B01D 13/00
[52] U.S. Cl. ................................... 210/638; 210/651; 210/500.2
[58] Field of Search ............... 210/651, 638, 639, 640, 210/321.1, 500.2; 204/180 P

[56] References Cited

U.S. PATENT DOCUMENTS

| | | | |
|---|---|---|---|
| 3,462,362 | 8/1969 | Kollsman | 210/639 X |
| 3,663,406 | 5/1972 | Bras et al. | 204/180 P |
| 3,950,247 | 4/1976 | Chiang et al. | 210/640 X |
| 4,042,496 | 8/1977 | Isushima et al. | 210/638 X |
| 4,125,462 | 11/1978 | Latty | 210/638 |

OTHER PUBLICATIONS

Gregor et al., "Synthetic-Membrane Technology," 7/78, pp. 112–128, from *Scientific American*.

Primary Examiner—Frank A. Spear, Jr.
Attorney, Agent, or Firm—Richard P. Crowley

[57] ABSTRACT

A method for preparing a fouling-resistant polymer membrane for use in the separation of aqueous, cathodic, electrode-position-paint compositions, which method comprises treating a negative-charged polymer membrane material, having fixed negative-charged groups in the polymer, with a polyelectrolyte polymer having fixed positive-charged nitrogen groups in an amount sufficient to provide for an excess of positive-charged groups in the treated membrane polymer.

14 Claims, No Drawings

POSITIVE-CHARGED ULTRAFILTRATION MEMBRANE FOR THE SEPARATION OF CATHODIC/ELECTRODEPOSITION-PAINT COMPOSITIONS

This is a continuation of application Ser. No. 165,279, filed July 2, 1980 (now abandoned).

BACKGROUND OF THE INVENTION

Ultrafiltration membranes have been employed extensively in the separation and concentration of electrophoretic aqueous paint compositions, particularly for use in the automotive field. The concentration and/or separation of cathodic electrophoretic paint compositions, through the use of ultrafiltration membranes, has been accompanied with many problems, due to the nature of the cathodic electrophoretic paint compositions employed. Typically the ultrafiltration membranes employed in such separation and concentration process have been subject to extensive and massive membrane fouling, leading to a rapid diminution in the flux of the membranes. Therefore, specific, special ultrafiltration membranes have been developed for specific cathodic electrophoretic paint compositions.

It has been found, for example, that ultrafiltration membranes, having fixed positive charges, are more immune to membrane fouling in the separation and concentration of cathodic electrophoretic paints than ultrafiltration membranes which do not have fixed positive charges. Typical ultrafiltration membranes in use, having fixed positive charges, generally contain positive-charged nitrogen atoms, such as membranes made from copolymers of acrylonitrile and an ionogenic comonomer. Such ultrafiltration membranes have not proven to be wholly satisfactory, and, therefore, there exists a need for the development of an ultrafiltration membrane particularly adapted to separate and concentrate cathodic electrophoretic paints without massive fouling, and which membrane has a long use life at high flux rates.

SUMMARY OF THE INVENTION

My invention relates to a high electrolyte, complex membrane having an excess positive charge and to the method of manufacturing such membrane and the use of such membrane particularly in the separation and concentration of cathodic electrodeposition aqueous paint compositions.

I have discovered a novel, fouling-resistant, high-flux, ultrafiltration membrane particularly suitable for use in the separation and concentration of cathodic paints. The ultrafiltration membrane of the invention comprises a membrane composed of a polymeric membrane material having fixed negative charges treated with a polyelectrolyte having fixed positive charges, or a negatively charged membrane whose surface is treated with a positive-charged polyelectrolyte, resulting in an ultrafiltration membrane having an excess positive charge. In particular, the ultrafiltration membrane comprises a negatively charged polymer, such as a polymer containing fixed negative groups, such as $SO_3^-$, $PO_3^-$, $PO_4^-$ and $COO^-$ groups, which negative-charged polymer has been blended with or treated by a polymer containing a positive charge, the polymer employed or treated in an excess with the fixed positive-charged material, so as to provide for a resulting complex, treated, ultrafiltration membrane having an excess positive charge.

More particularly, the positive-charged material employed in the preparation of the complex, polyelectrolyte, blended membrane comprises an alkylene imine polymer, such as a polyethylene imine polymer or polypropylene imine polymer, or derivatives therefrom, the imine polymer reactive in an ionic complex with the negative-charged groups of the membrane polymer in which it is blended or onto which it is adsorbed, to provide the polyelectrolyte, complex, ultrafiltration membrane polymer of the invention having an excess positive charge thereon.

In one embodiment of the invention, it has been found that an ultrafiltration blended polymer, particularly suitable for use with cationic paints, would comprises a complex of a polyethylene imine polymer with a polyvinylidene fluoride polymer, particularly a polyvinylidene fluoride polymer having $SO_3$ groups thereon, such as a PVDF polymer which has been sulfonated, so as to form a negative-charged $PVDF-SO_3$ polymer which is reacted with the polyethylene imine polymer, to provide a complex polymer having an excess positive charge. The sulfonated PVDF-polyethylene imine polymer complexes have been shown to be fouling-resistant in use in cathodic paints over a long period of time, in comparison to the polymers not having the polyethylene imine complex.

The ultrafiltration membrane of the invention may be prepared by adsorbing onto, or otherwise treating, an ultrafiltration polymeric membrane bearing negative fixed charges with a cationic polyelectrolyte containing positive fixed charges, the amount of the cationic polyelectrolyte employed being sufficient to create a polyelectrolyte complex membrane having an excess of positive charges. For example, a sulfonated PVDF polymeric membrane, which normally is not suitable for a long fouling life with cationic aqueous paint compositions, when treated with a solution of a polyelectrolyte, particularly a nitrogen-containing polyelectrolyte polymer, such as polyethylene imine or its homologs or derivatives, provides for a polyelectrolyte membrane having an excess positive charge. The treated polymer has a much longer fouling-resistant time and maintains a flux rate for a longer period of time than the untreated sulfonated PVDF membrane.

Suitable negatively charged polymeric membranes which may be treated in accordance with my invention include, but are not limited to, ultrafiltration membranes containing acrylic acid copolymers above pH 5.5; vinyl sulfonic acid copolymers; styrene sulfonic acid copolymers; methallyl sulfonic acid copolymers; p-(methylenephosphoric acid)-vinyl benzene copolymers; PVDF and blends and combinations thereof.

Suitable positively charged polyelectrolytes which may be used to treat the negatively charged polymer and to be reacted therewith or absorbed thereon include, but are not limited to, those nitrogen-containing materials, particularly amino-containing polymers, such as polyalkylene imines; polyvinyl benzene amines; polyvinyl pyridine; polyvinyl acetamide and blends and combinations thereof. Those polymers containing secondary, tertiary or quaternary nitrogen atoms are preferred, and particularly polyethylene imines or quaternized polyethylene imines. Polyethylene imine comprises mainly secondary amino groups in the polymer chain, with some primary amine groups at the ends of the chain and some tertiary amino groups at the side chains, and may be used in quaternary form.

The treating of the membrane with the polyelectrolyte may be carried out in one manner by contacting the membrane with an aqueous or nonsolvent solution of the polyelectrolyte under conditions to effect the adsorbing or reacting of the polyelectrolyte, to obtain an excess of positive charges on the membrane. For example, the positively charged polyelectrolyte is applied to the negatively charged membrane by flowing a 0.1% to 10.0% solution of the positively charged polyelectrolyte past the negatively charged membrane at a pressure of 5 to 100 psig and a temperature of 5° C. to 70° C. The preferred conditions are 0.1% to 1% polyelectrolyte concentration, 10 to 50 psig and 15° C. to 50° C.

More particularly, it has been found that a superior ultrafiltration membrane is prepared through the absorption of the polyethylene imine polymer in a solution by treating the sulfonated PVDF polymer with the polyethylene imine solution. The positive-charged polyelectrolyte employed to treat the negatively charged polymer should be employed in sufficient amounts, so that the resulting ultrafiltration polymer has an excess of positive charges therein.

The invention will be described for the purpose of illustration only in connection with the preparation of the specific preferred embodiments of the polyelectrolyte polymer of the invention. However, it is recognized that those persons skilled in the art may make various changes and modifications, all within the intent and scope of the invention.

DESCRIPTION OF THE EMBODIMENTS

EXAMPLE 1

A polyvinylidene fluoride polymer (PVDF) was blended with a sulfonated vinyl amino compound having the structure:

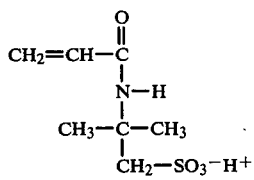

to prepare negative-charged, sulfonated, PVDF-membrane, blend polymer. This blend was made into an ultrafiltration membrane which was treated with a solution of polyethylene imine, to provide a positive-charged membrane polymer of the invention.

The PVDF, sulfonated, vinyl-amino compound membrane was treated with a 0.2% polyethylene imine solution at a temperature of 20° C. and 15 psig, by flowing the solution past the membrane at a velocity of 200 cm/s for 30 minutes.

EXAMPLE 2

The negative-charged, PVDF blend polymer (A−) and the positive-charged polymer (B+) of the invention (containing the $SO_3^-$ and the nitrogen+) were then compared in flux rate using an aqueous, cathodic, electrodeposition-paint composition; namely, PPG ED 3002, an automotive body primer, with the following results:

TABLE I

| | Negative-Charged Polymer A− | | Positive-Charged Polymer B+ | |
|---|---|---|---|---|
| Time Hours | ΔP (psig) | Flux (cc/min) | ΔP (psig) | Flux (cc/min) |
| 0 | 25 | 2.00 | 25 | 2.00 |
| 23 | 25 | 1.40 | 25 | 1.96 |

The results show that the sulfonated PVDF polymer A− flux dropped after 23 hours, while the flux of the positive-charged polymer B+ had not changed substantially over a 23-hour period.

EXAMPLE 3

The polyelectrolyte complex membrane (B+) and a commercial positively charged membrane were tested with a cathodic, aqueous, body-primer, paint composition under the same hydraulic conditions, with the results of the test shown in Table II.

TABLE II

| | Flux cc/min | | |
|---|---|---|---|
| | Initial Flux | Flux at 27 days | Flux at 40 days |
| Commercial UF membrane | 1.6 | 0.91 | — |
| Polyelectrolyte complex membrane (Polymer B+) | 1.8 | 1.68 | 1.67 |

The positive-charged polymer B+ of the invention was clearly superior in fouling resistance with cathodic paints than the commercial, positive-charged, ultrafiltration membrane.

What I claim is:
1. A method for the concentration of an aqueous cationic electrodeposition-paint composition, which method comprises:
   (a) providing a foul-resistant polyvinylidene fluoride polymer membrane prepared by treating a negative-charged polymer membrane material, having fixed negative-charged groups in the polymer, with a polyelectrolyte polymer having fixed positive-charged nitrogen groups in an amount sufficient to provide for an excess of positive-charged groups in the treated membrane polymer; and
   (b) employing the foul-resistant polymer membrane in the ultrafiltration concentration of a cationic electrodeposition-paint composition, whereby concentration of the paint composition is accomplished with high flux rate and with a long membrane use life.
2. The method of claim 1 wherein the negative-charged polymer material comprises polyvinylidene fluoride polymer blended with a vinyl amino compound having the structure:

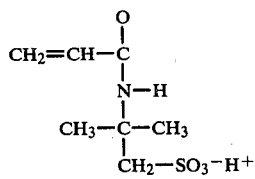

to provide a sulfonated polyvinylidene fluoride polymer.

3. The method of claim 1 wherein the polymer membrane comprises a sulfonated polymer.

4. The method of claim 1 wherein the polymer membrane comprises a polyvinylidene fluoride polymer having sulfonated groups.

5. The method of claim 1 wherein the polyelectrolyte comprises a polyalkylene imine polymer.

6. The method of claim 1 wherein the polyelectrolyte comprises a polyethylene imine polymer.

7. The method of claim 1 which includes contacting the polymer membrane material with an aqueous solution of a polyethylene imine polymer.

8. The method of claim 1 wherein the polymer membrane material contains fixed negative-charged groups selected from the group consisting of $SO_3^-$, $PO_3^-$, $PO_4^-$ and $COO^-$ and combinations thereof.

9. The method of claim 1 which includes dissolving the polyelectrolyte polymer in a solvent for the polyelectrolyte, which solvent is a nonsolvent for the polymer membrane material.

10. The method of claim 1 which comprises contacting the polymer membrane material with an aqueous solution of from about 0.1% to 10% by weight of a polyethylene imine at a temperature of from about 5° C. to 70° C. and at a pressure of from about 5 to 100 psig.

11. The method of claim 1 wherein the polymer membrane material is selected from the group consisting of acrylic acid copolymers above pH 5.5, vinyl sulfonic acid copolymers, styrene sulfonic acid copolymers, methallyl sulfonic acid copolymers, p-(methylenephosphoric acid)-vinyl benzene copolymers and blends with polyvinylidene fluoride polymer.

12. A method for the concentration of an aqueous cationic electrodeposition-paint composition, which method comprises:
  (a) providing a foul-resistant polymer membrane prepared by contacting a negative-charged, sulfonated, polyvinylidene fluoride polymer membrane with a solution containing a polyethylene imine polymer in an amount sufficient to provide a treated polymer membrane having an excess of positive charges; and
  (b) employing the foul-resistant polymer membrane in the ultrafiltration concentration of cationic electrodeposition-paint composition, whereby concentration of the paint composition is accomplished with high flux rate and with a long membrane use life.

13. The method of claim 12, which method includes flowing a solution, containing from about 0.1% to 1% by weight of the polyethylene imine polymer, into contact with the surface of the polymer membrane at a pressure of from about 10 to 50 psig and at a temperature of from about 15° C. to 50° C.

14. The method of claim 1 which comprises contacting the polymer membrane with an aqueous solution of from about 0.1% to 10% by weight of a polyethylene imine at a temperature of from about 5° C. to 70° C. and at a pressure of from about 5 to 100 psig.

* * * * *